United States Patent [19]
Hurlburt

[11] 3,741,020
[45] June 26, 1973

[54] ELECTROMAGNETIC GYRO TORQUER

[75] Inventor: Charles E. Hurlburt, River Edge, N.J.

[73] Assignee: The Bendix Corporation, Teterboro, N.J.

[22] Filed: Aug. 18, 1971

[21] Appl. No.: 172,692

[52] U.S. Cl. .................................... 74/5.46, 74/5.6
[51] Int. Cl. .......................................... G01c 19/30
[58] Field of Search ..................... 74/5.46, 5.4, 5.6; 33/204 Q

[56] References Cited
UNITED STATES PATENTS

| | | | |
|---|---|---|---|
| 2,468,113 | 4/1949 | Russ | 74/5.46 |
| 2,229,645 | 1/1941 | Esval et al. | 74/5.46 |
| 2,552,132 | 5/1951 | Anderson | 74/5.46 |
| 2,916,919 | 12/1959 | Echolds | 74/5.46 |
| 2,339,606 | 1/1944 | Sias | 74/5.46 |
| 2,510,968 | 6/1950 | Fowler | 74/5.46 |

FOREIGN PATENTS OR APPLICATIONS

| | | | |
|---|---|---|---|
| 447,232 | 3/1948 | Canada | 74/5.46 |
| 912,182 | 4/1946 | France | 74/5.46 |
| 359,071 | 1931 | Great Britain | 74/5.46 |

Primary Examiner—Manuel A. Antonakas
Attorney—Anthony F. Cuoco et al.

[57] ABSTRACT

An electromagnet is arranged with a gyro so that eddy currents generated by movement of a conductor in the field of the magnet provide a precessionaly torque, a component of which decelerates or opposes gyro rotation when the spin axis of the gyro is not coincident with the magnet axis. When said axes are coincident, no further precessional and decelerating torques are provided.

5 Claims, 6 Drawing Figures

3,741,020

ELECTROMAGNETIC GYRO TORQUER

BACKGROUND OF THE INVENTION

1. Field of the Invention

This invention relates to gyro torquers and, particularly, to electromagnetic torquers commonly known in the art as dome torquers. More particularly, this invention relates to improved dome torquers.

2. Description of the Prior Art

A dome torquer for a gyro generally includes a magnet which, due to its proximity to a conducting dome rotated by the gyro, produces a precessional torque caused by eddy currents generated by rotation of the dome in the magnetic field. This torque is always in a direction to oppose gyro rotation and when the gyro spin axis is not coincident with the axis of the magnet a component of the torque drives the gyro directly toward such coincidence. The ability to precess a gyro as aforenoted, without resorting to conventional gimbal mounted torquers, is advantageous in certain applications.

Prior dome torques have a disadvantage in that opposing or deceleration torque exists even after coincidence of gyro and magnet axes and extra power is required for the gyro to overcome this effect.

SUMMARY OF THE INVENTION

This invention contemplates an arrangement for generating precessional torques only when gyro and magnet axes are misaligned. This result is achieved by providing a thin spherical shell or dome of a conductive material mounted to the gyro rotor for rotation therewith about the axis of symmetry of the dome and an electromagnet disposed on the gyro inner gimbal and having an E-shaped cross section for providing a central magnetic pole surrounded by a circular pole of opposite polarity. The electromagnet has a symmetrical magnetic field and is arranged so that its flux intercepts the conductive dome and the axis of flux symmetry is aligned with the spin axis of the gyro. As the dome moves through the flux field, electromotive forces (emf) are induced in the dome and when the gyro and magnet axes are misaligned the emf causes current to flow for generating a torque which opposes or decelerates gyro rotation. Due to the symmetry of the magnetic field no such torque is generated when alignment of axes is achieved.

One object of this invention is to provide a torque for precessing a gyro without using conventional gimbal mounted torquers.

Another object of this invention is to provide said precessing torque by using an electromagnet, the axis of which is originally misaligned with the gyro spin axis, and the precessing torque being effective for reducing said misalignment to zero.

Another object of this invention is to provide an arrangement for generating a torque which opposes the gyro rotation when the gyro and magnet axes are misaligned, but does not generate said torque when alignment is achieved.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
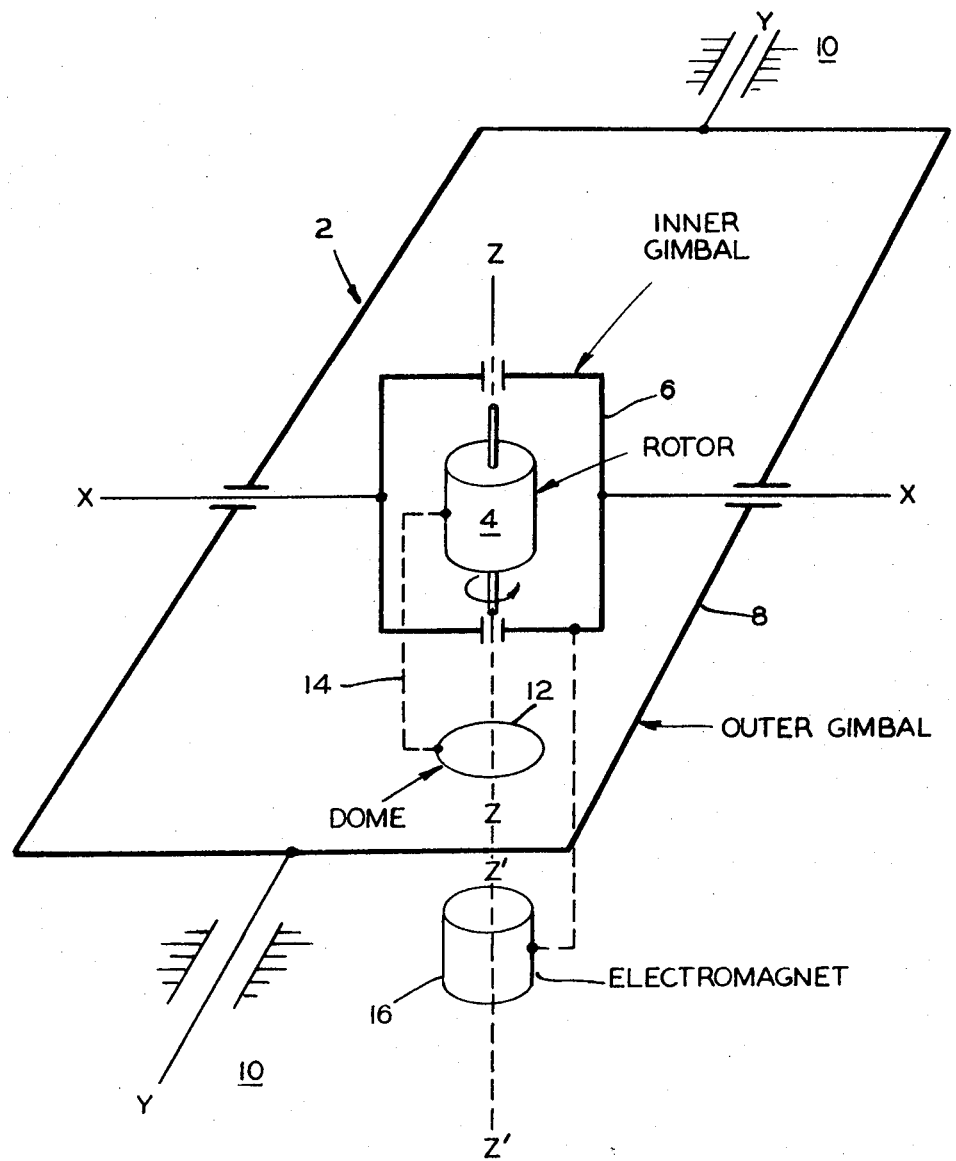
FIG. 1 is a diagrammatic representation showing the structural relation between an electromagnetic torquer and a gyro according to the invention.

FIG. 1 shows a gyro 2 having a rotor 4 journalled in an inner gimbal 6. Inner gimbal 6 is pivotally mounted to an outer gimbal 8 and outer gimbal 8 is journalled in a case or housing 10.

A dome 12 is mounted by suitable means 14 to rotor 4 and rotates therewith. An electromagnet 16 is mounted to inner gimbal 6. An axis Z—Z is the spin axis of rotor 4 and the axis of symmetry of dome 12, and an axis Z'— Z' is the axis of electromagnet 16. Axes Z—Z and Z'— Z' are shown coincident in the Figure.

Figure 3:
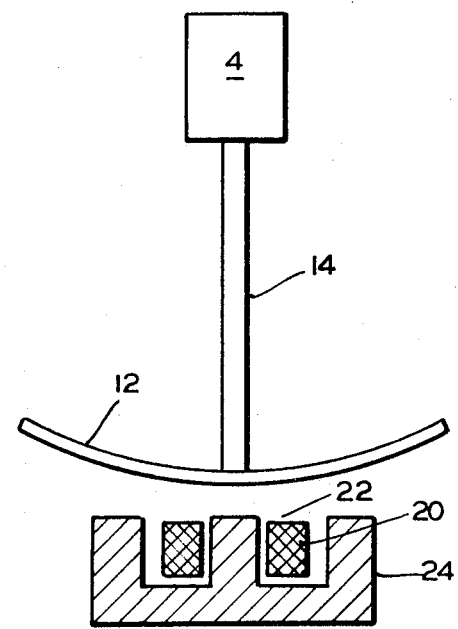
FIG. 3 is a diagrammatic representation illustrating the structural relationship between the electromagnet of FIG. 2 and a conductive dome affixed to a gyro rotor and having an axis of symmetry coincident with the gyro spin axis according to the invention.
Figure 2:
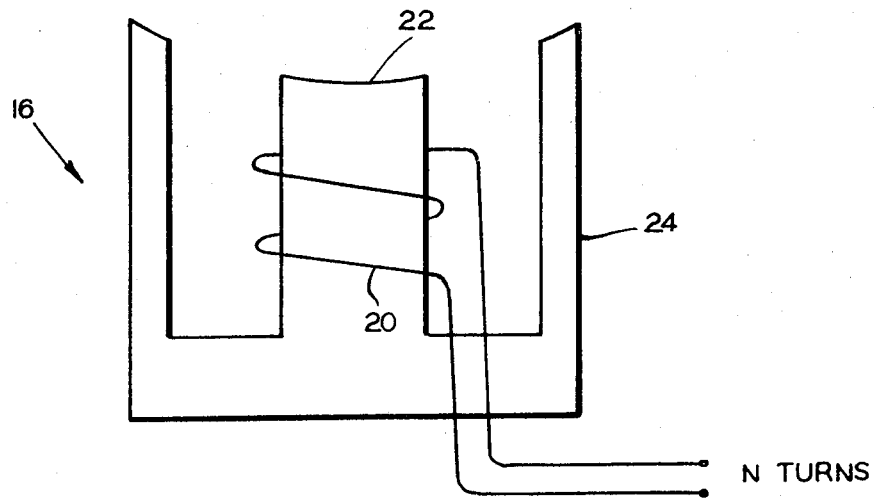
FIG. 2 is a diagrammatic representation illustrating the configuration of an electromagnet according to the invention.

The design of magnet 16 is best shown in FIG. 2. A coil 20 of N turns is wound on a central core 22 of soft iron in the center of a soft iron hollow cylinder 24. With the arrangement shown, a central magnetic pole is provided, and which pole is surrounded by a uniform circular pole of opposite polarity. A CROSS-section of magnet 16 is E-shaped as shown in FIG. 3, and wherein the structural relationship of the magnet and dome 12 is best shown.

Thus, dome 12 is a thin spherical shell of a conductive material such as copper which is affixed by means 14 to gyro rotor 4 so to rotate at high speed therewith about axis Z—Z and hence acts as part of the gyro spin inertia. Electromagnet 16 has a symmetrical flux field and is arranged so that its flux intercepts the conductive dome, with the axis of flux symmetry being axis Z'— Z'.

Figure 4:
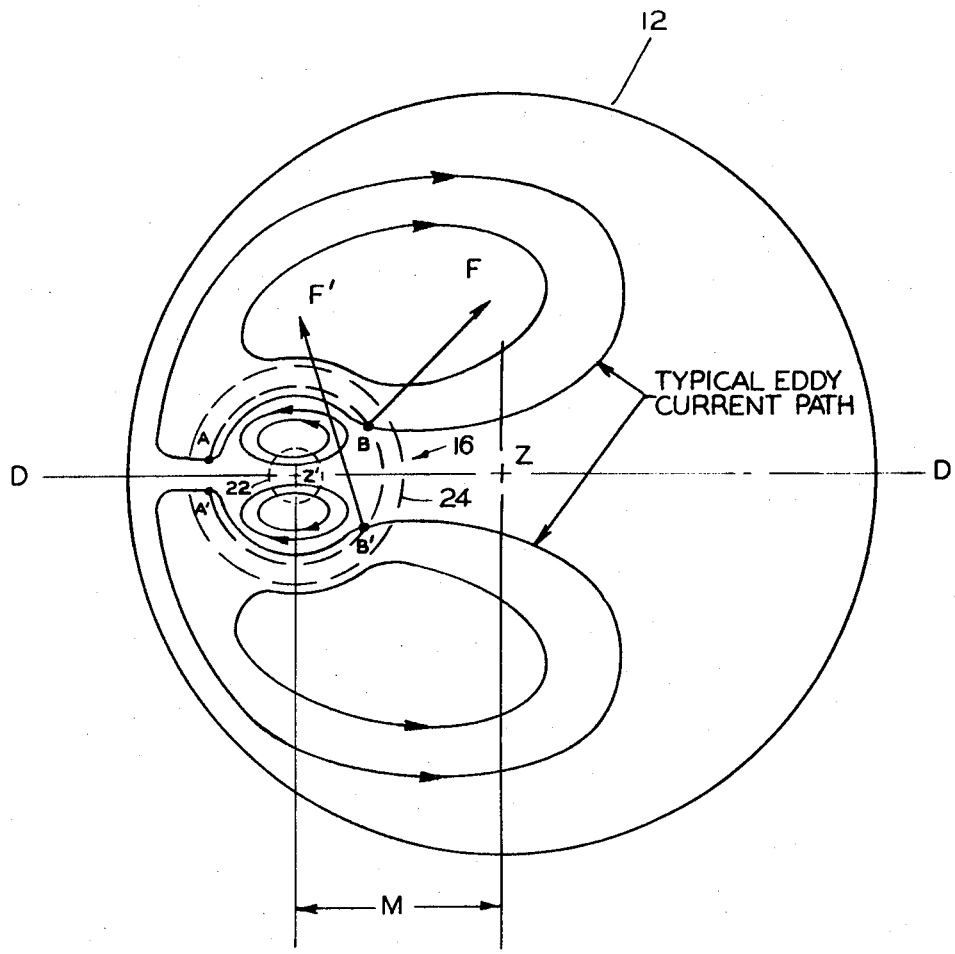
FIG. 4 is a diagrammatic representation showing eddy currents produced by relative motion between the dome and the magnet of FIG. 3 when the dome and magnet axes are misaligned.

With reference now to FIG. 4, as dome 12 moves through the flux field of magnet 16 eddy currents induce emf in the dome. When the angular misalignment between dome axis Z—Z and magnet axis Z'— Z' is zero, the emf is incapable of driving currents steadily through the dome. This fact is due to the radial symmetry of the configuration which prevents the existence of closed paths having a potential drop other than zero, and which therefore can only cause the potential at the center of the dome to be different than the potential at the edge of the dome.

When the axis misalignment is other than zero (M) as shown in FIG. 4, the emf generated causes current to flow in the dome. These currents, in accordance with Lenz's law, flow in a direction so as to create a field opposing the relative motion that caused the current. Because the magnetic flux field is symmetric, symmetric currents will flow in the two halves of dome 12 on either side of the dome diameter D-D through the dome and magnet axes Z—Z and Z'— Z', respectively. It is to be noted that the dome currents in the half approaching electromagnet 16 are equal in magnitude but flow in opposite sense to the currents in the half leaving the electromagnet.

Because of the symmetry of the flux field, two sets of dome currents flow through the flux fields at equivalent points B and B' above and below the diameter of current symmetry (D—D). Thus, the magnitude of forces, F and F', respectively, are equal, although their directions differ. At each equivalent point the force is perpendicular to the eddy current path and depends upon the current's direction of flow. Because the currents have opposite flow direction at either side of the diameter of symmetry D—D, the forces at equivalent points will be at equal angles at either side of a normal to said diameter of symmetry.

Figure 5:
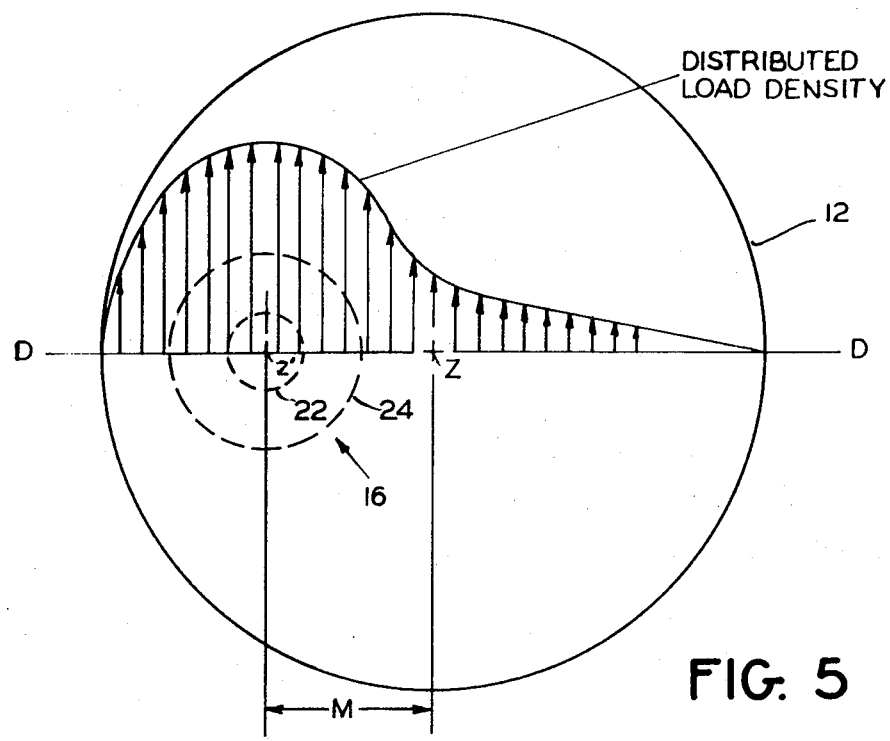
FIG. 5 is a diagrammatic illustration showing the distribution of dome forces when the dome and magnet axes are misaligned.

The vector resultant of forces F AND F' at equivalent points B AND B is directed along the normal to the diameter of symmetry due to the aforenoted relation between the magnitudes and directions of the forces. Similarly, the vector resultant force on all points on the dome within a narrow strip normal to the diameter of symmetry can be determined. This resultant force will lie along the narrow strip. By combining the resultants for all such narrow strips, the resultant distributed loading on the dome is as shown in FIG. 5.

This distributed loading can be replaced by its equivalent, i.e., a moment about the center line of electromagnet 22 and a force through said center line acting normal to the diameter of symmetry (D—D), that is; in the plane of misalignment (M) between magnet 22 and dome 12.

The feature of the invention, wherein no deceleration forces (forces opposing gyro rotation) are produced when magnet axis Z—Z and gyro spin and dome axis Z'— Z' coincide, is illustrated with reference to FIGS. 4 and 6. In FIG. 4, the emf at a point A is greater than at point B and the emf at a point A is greater than at point B because the velocity of dome 12 is greater at A and A' than it is at B and B'. For this reason eddy currents flow as shown in FIG. 4 with resultant precessional torques and a deceleration component opposing gyro rotation.

Figure 6:
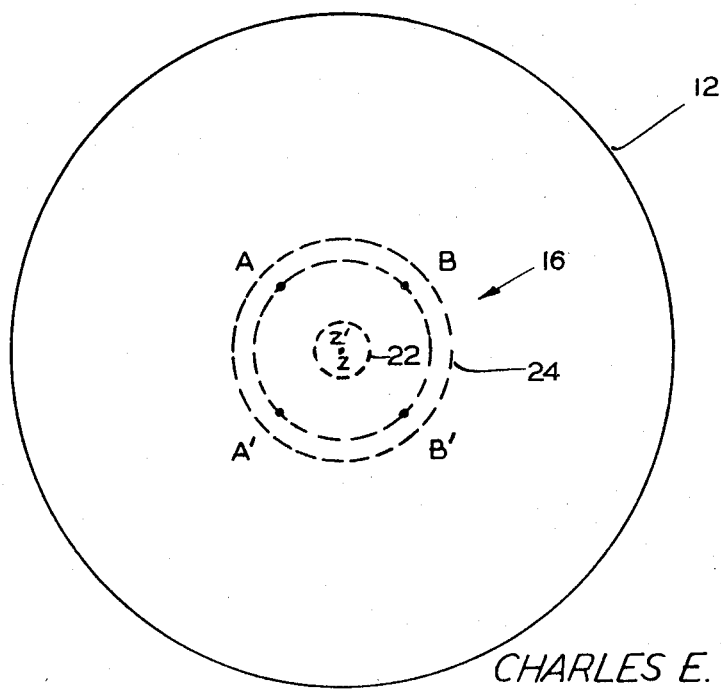
FIG. 6 is a diagrammatic illustration showing emf generated in the dome when the dome and electromagnet axes are coincident.

In FIG. 6, wherein magnet axis Z—Z and gyro and dome axis Z'— Z' are shown coincident, the velocity of A, A , B, B is the same so that the emf at said points are equal and no current is flowing, even though lines of flux are being cut by a moving conductor. Therefore, no torque, precessional or deceleration, occurs under these conditions.

This feature of the invention is contrasted to prior art dome torquer designs, wherein a plurality of alternate North and South Poles exist in the circle shown by points A, A', B and B', with resultant alternate positive and negative *emf*'s in this path. These *emf*'s, although quantitively equal, are alternately of opposite polarity and result in the flow of eddy current with resultant deceleration torque. It will now be seen that the configuration of the invention as heretofore described eliminates this problem.

While one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A gyroscopic system, comprising:
   a housing
   an outer gimbal journalled in the housing for displacement about a first axis;
   an inner gimbal pivotally mounted to the outer gimbal for displacement about a second axis;
   a rotor journalled in the inner gimbal for spinning about a third axis;
   said first, second and third axes being mutually perpendicular;
   a conductive member supported for movement in response to spinning of the rotor and having an axis of symmetry coincident with the third axis;
   a magnet having a symmetrical flux field and supported by the inner gimbal below the conductive member so that the magnetic flux intercepts the conductive ember; and
   the magnet and conductive member arranged so that as the conductive member moves it cuts through the flux filed of the magnet for providing a torque which opposes gyro rotation only when the gyro spin axis and the axis of flux symmetry are not coincident.

2. A gyroscopic system as described by claim 1, wherein:
   the magnet has an E-shaped cross-section and includes a central magnetic pole of one polarity surrounded by a circular pole of opposite polarity.

3. A gyroscopic system as described by claim 1, wherein:
   the conductive member is supported by the rotor for rotating therewith to act as part of the gyro spin inertia.

4. A gyroscopic system as described by claim 1, wherein:
   movement of the conductive member through the flux field of the magnet causes eddy currents to be generated which induce an electromotive force in the conductive member; and
   when the gyro spin axis and axis of flux symmetry are not coincident the electromotive force causes current to flow in the conductive member in a sense so as to create a field opposing motion causing said current.

5. A gyroscopic system as described by claim 4, wherein:
   symmetric currents will flow in two halves of the conductive member on either side of an axis normal to the rotor spin axis and the axis of symmetry of the conductive member coincident therewith.

* * * * *